(12) United States Patent
Zhu et al.

(10) Patent No.: US 9,466,020 B2
(45) Date of Patent: Oct. 11, 2016

(54) SYSTEMS AND METHODS FOR A RFID ENABLED METAL LICENSE PLATE

(71) Applicant: NEOLOGY, INC., Poway, CA (US)

(72) Inventors: Jeffrey Zhu, Carlsbad, CA (US);
Chih-chuan Yen, San Diego, CA (US);
Jason Liu, San Diego, CA (US); Joe Mullis, Oceanside, CA (US)

(73) Assignee: NEOLOGY, INC., Poway, CA (US)

( * ) Notice: Subject to any disclaimer, the term of this patent is extended or adjusted under 35 U.S.C. 154(b) by 0 days.

(21) Appl. No.: 14/685,530

(22) Filed: Apr. 13, 2015

(65) Prior Publication Data

US 2015/0220828 A1  Aug. 6, 2015

Related U.S. Application Data

(63) Continuation of application No. 13/708,353, filed on Dec. 7, 2012, now Pat. No. 9,007,215, which is a continuation of application No. 11/962,047, filed on Dec. 20, 2007, now Pat. No. 8,344,890.

(60) Provisional application No. 60/871,273, filed on Dec. 21, 2006.

(51) Int. Cl.
*H04Q 5/22* (2006.01)
*G06K 19/077* (2006.01)
*G08B 13/14* (2006.01)
*G08B 23/00* (2006.01)

(52) U.S. Cl.
CPC ... *G06K 19/07758* (2013.01); *G06K 19/07773* (2013.01)

(58) Field of Classification Search
USPC .................. 340/10.1, 572.8, 572.7, 693.5
See application file for complete search history.

(56) References Cited

U.S. PATENT DOCUMENTS

| 5,621,571 | A | 4/1997 | Bantli et al. |
| 6,025,784 | A * | 2/2000 | Mish ........................ 340/693.5 |
| 7,164,387 | B2 | 1/2007 | Sievenpiper |
| 7,463,150 | B2 | 12/2008 | Rajan |
| 2003/0067389 | A1 * | 4/2003 | Look ......................... 340/572.1 |
| 2004/0085244 | A1 | 5/2004 | Kadambi et al. |
| 2004/0095241 | A1 | 5/2004 | Maloney |
| 2005/0035915 | A1 | 2/2005 | Livingston et al. |
| 2005/0104793 | A1 * | 5/2005 | Yuanzhu ....................... 343/770 |
| 2006/0187063 | A1 | 8/2006 | Rietzler et al. |
| 2006/0261950 | A1 * | 11/2006 | Arneson et al. ........... 340/572.1 |
| 2007/0171077 | A1 * | 7/2007 | Kawarizadeh ............. 340/572.8 |
| 2008/0042848 | A1 * | 2/2008 | Roberts et al. ............. 340/572.7 |
| 2010/0026582 | A1 * | 2/2010 | Choi et al. .............. 343/700 MS |
| 2010/0214187 | A1 | 8/2010 | Sugita et al. |

OTHER PUBLICATIONS

International Search Report for PCT/US2007/088227, date of mailing May 1, 2008 (10 pages).

* cited by examiner

*Primary Examiner* — Jack K Wang
(74) *Attorney, Agent, or Firm* — Procopio, Cory, Hargreaves & Savitch LLP; Noel C. Gillespie

(57) ABSTRACT

In the embodiments described herein, a RFID enabled license plate is constructed by using the license plate, or a retro-reflective layer formed thereon as part of the resonator configured to transmit signals generated by and RFID chip integrated with the license plate. Such an RFID enabled license plate can include a metal license plate with a slot formed in the metal license plate, and a RFID tag module positioned in the slot. The RFID tag module can include a chip and a loop, and the loop can be coupled with the metal license plate, e.g., via inductive or conductive coupling. In this manner, the metal license plate can be configured to act as a resonator providing increased performance.

15 Claims, 6 Drawing Sheets

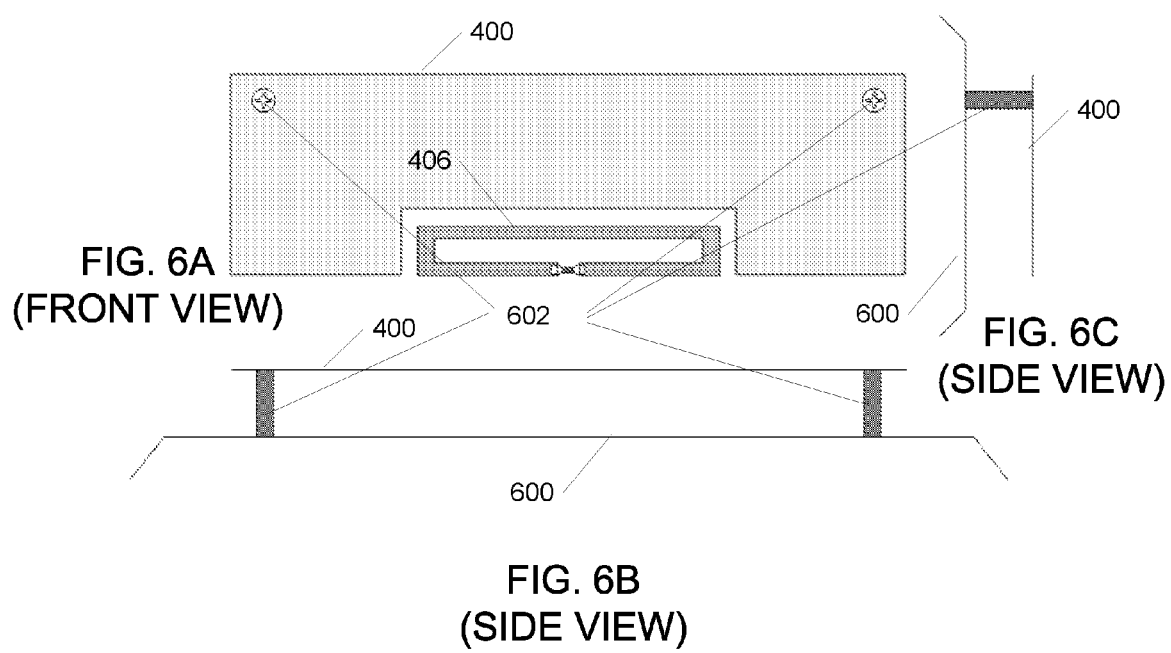

SYSTEMS AND METHODS FOR A RFID ENABLED METAL LICENSE PLATE

RELATED APPLICATIONS INFORMATION

This application is a continuation of Ser. No. 13/708,353, filed on Dec. 7, 2012, which is a continuation to U.S. patent application Ser. No. 11/962,047, filed Dec. 20, 2007, now U.S. Pat. No. 8,344,890, issued on Jan. 1, 2013, which in turn claims the benefit under 35 U.S.C. 119(e) to U.S. Provisional Patent Application Ser. No. 60/871,273, filed Dec. 21, 2006, all of which are incorporated herein by reference in their entirety as if set forth in full.

BACKGROUND

1. Field of the Invention

The embodiments described herein relate generally to electronic vehicle registration and tracking systems, and more particularly to the use of Radio Frequency Identification (RFID) in such systems.

2. Background of the Invention

RFID technology has long been used for electronic vehicle tolling applications. In such applications, an RFID reader or interrogator is position over or near a road way at a point where a toll is to be collected. An RFID tag is then place in each vehicle that includes an identifier by which the vehicle can be recognized, e.g., the vehicle's license plate number. The interrogator then uses RF signals to interrogate the tag and obtain the identifier so that the toll can be applied to the correct vehicle, or account.

Generally, the tag to interrogator communication is achieved through a form of modulation known as backscatter modulation. In a backscatter modulation system, the tag does not generate its own RF carrier signal when transmitting information to the interrogator. Rather, the interrogator generates an RF carrier and modulates the carrier with data intended for the tag, e.g., a request for the tags identifier information. The tag receives the modulated signal decides the data and then performs actions in accordance therewith e.g., accesses the memory and obtains the requested identifier information. The interrogator continues to transmit the RF carrier, now with no data on it. The tag receives this un-modulated carrier and reflects it back to the interrogator. This is called backscatter. In order to send data back to the interrogator, e.g., identifier, the tag modulates the reflected, or backscatter signal with the data.

For example, the tag will alternately backscatter and not backscatter the RF carrier signal for a certain period of time in order to transmit a digital "0" an "1" respectively. Thus, the tag modulates the backscatter signal by reflecting or not reflecting the signal based on the data, i.e., "1s" and "0s," to be sent. The interrogator receives the modulated backscatter signal and decodes the information received thereon.

Early on, such tags were active device, meaning they possessed their own power source, such as a battery. An active tag was necessary, for example, in order to generate enough power in the reflected signal to transmit information over extended distances. But more recently, passive tag technology has become more viable. A passive tag does not include a battery or power source of its own. Rather, energy in the RF signals received from the interrogator is used to power up the tag. For example, the received RF signal can be rectified and used to charge up a capacitor that is then used to power the tag.

As antenna and integrated circuit technology has evolved, larger and larger distances can be achieved with passive tags of smaller and smaller dimensions. Accordingly, small, thin, light weight tags can be used in a wide variety of applications. Often these tags are referred to as sticker tags or RFID labels, because of their dimensions and the fact that they can be manufactured to include an adhesive layer so that they can be applied to the outside of containers, the surface of documents, inventory, etc. In other words the tags can be applied like a label or sticker.

The emergence of passive, sticker tag technology has also greatly reduced the cost of implementing an RFID system. As a result, new applications, such as Electronic Vehicle Registration (EVR) using RFID, have emerged. Currently, e.g., in the United States, a vehicle owner registers their vehicle with the State government and pays a fee. The owner is then provider a sticker, which is applied to the vehicle license plate, to evidence the valid registration of the vehicle; however, these stickers can easily be counterfeited or stolen, i.e., removed and applied to another vehicle. Such activity is difficult to detect, because the only way to determine that a registration sticker does not belong on a certain vehicle is to access a database and check the corresponding information.

For example, in the United States, an estimated five to ten percent of motorists fail to legally register their vehicles, resulting in lost annual state revenues of between $720 million and $1.44 billion. Outside of the United States, some government agencies report the problem at 30-40% of the vehicles.

Deploying an Electronic Vehicle Registration system can help Motor Vehicle Administrators achieve increases in vehicle compliance and associated revenues by eliminating the need to rely on inefficient, manual, visual-based compliance monitoring techniques. EVR uses RFID technology to electronically identify vehicles and validate identity, status, and authenticity of vehicle data through the use of interrogators and tags that include data written into the tag memory that matches the vehicle registration data. Fixed, e.g., roadside, or handheld interrogators can then be used to read the data out when required. Thus, RFID technology can enable automated monitoring of vehicle compliance with all roadway usage regulations, e.g., vehicle registration, tolling, etc., through a single tag.

There are two common ways of attaching a RFID tag to a vehicle, one is using an RFID label tag attached to the windshield of the vehicle. The tag can then be read by a roadside or handheld reader. A second method of attaching the tag to a vehicle is to embed the RFID tag into the license plate. This has the convenience an continuity of replicating the application of current registration stickers; however, such a solution can also suffer from reduced transmission, i.e., communication distance due to the effects the metal license plate has on the performance of the tag antenna.

For example, as illustrate in FIG. 1, a RFID tag 100 consisting of a RFID chip 102 and an antenna 104 can be mounted on the vehicle license plate 110. As mentioned, however, license plate 110 is usually made from metal. As a result, the tag information may not be readable due to the shielding effects of metal surrounding tag 100. Moreover, if tag 100 is directly applied to the metal surface of license plate 110, then tag antenna 104 can be shorted or severely detuned by the metal surface. As a result, tag 100 will not be read, or will only be readable at very short distance.

A conventional approach to overcoming this issue is to leave some spacing 202 between tag 100 and metal license plate 110 as shown in FIG. 2. Such a solution has an added benefit in that metal license plate 110 can also serve as a back plane for tag antenna 104. For example, as illustrated in FIG. 3, an RFID tag 100 can be housed within an non-metal enclosure 302, e.g., formed from a low dielectric material that includes a spacer 304 such as an air gap or foam material.

One problem with such a conventional solution is the increased dimension, i.e., thickness of the resulting license plate assembly. Accordingly, conventional approaches force a tradeoff between reduced performance, or increased size and dimensions, which can have a negative impact.

SUMMARY

In the embodiments described herein, a RFID enabled license plate is constructed by using the license plate, or a retro-reflective layer formed thereon as part of the resonator configured to transmit signals generated by and RFID chip integrated with the license plate.

For example, in one aspect, such an RFID enabled license plate can include a metal license plate with a slot formed in the metal license plate, and a RFID tag module positioned in the slot. The RFID tag module can include a chip and a loop, and the loop can be coupled with the metal license plate, e.g., via inductive or conductive coupling. In this manner, the metal license plate can be configured to act as a resonator providing increased performance.

In another aspect, the RFID tag module can be positioned substantially within the slot such that the addition of the RFID tag module does not increase the thickness of the license plate.

In still another aspect, the RFID enabled license plate can comprise a RFID tag module, positioned in the slot, which includes a chip and contacts. The contacts connected with the metal license plate, e.g., via a conductive paste or a solder connection.

In still another aspect, the RFID enabled license plate can comprise a license plate and a retro-reflective layer formed over the license plate. A slot can then be formed in the retro-reflective layer, and a RFID tag module can be positioned in the slot. The RFID tag module can include a chip and a loop, and the loop coupled with the retro-reflective layer, e.g., via inductive or conductive coupling.

In still another aspect, the RFID enabled license plate can include a retro-reflective layer formed over the license plate and a slot formed in the metal license plate. A RFID tag module can be positioned in the slot. The RFID tag module can comprise a chip and contacts, and the contacts connected with the metal license plate, e.g., via a conductive paste or a solder connection.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIGS. 6A-C are diagrams illustrating an example RFID enabled license plate in accordance with another embodiment;

DETAILED DESCRIPTION

The embodiments described below are directed to system and methods for a RFID enabled license plate in which a metal layer of the license plate is actually used to radiate backscattered energy generated by a RFID tag positioned within a slot created in the license plate. Accordingly, not only does the metal license plate not interfere with the operation of the tag, it actually assists.

Certain embodiments described herein are directed to methods for creating an antenna structure directly on (1) a metal license plate, (2) a metalized retro-reflective foil covering a non-metal license plate, or (3) a metalized retro-reflective foil covering the metal license plate. Depending on the embodiment, the RFID chip can be directly connected to or electrically coupled, either capacitive or inductively, with the antenna structure. The antenna structure can be a single or multi-frequency resonant structure.

Figure 4A:
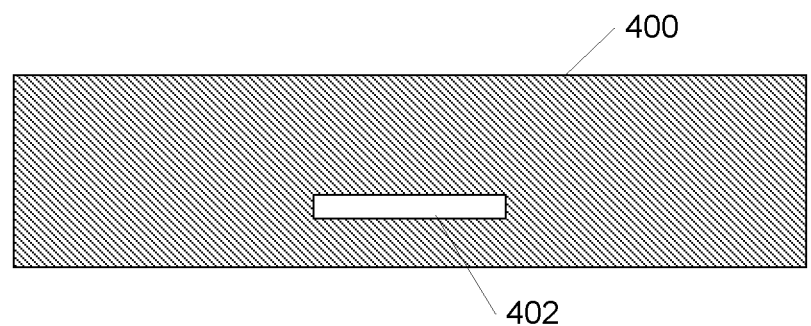
FIGS. 4A and 4B are diagrams illustrating an example RFID enabled license plate in accordance with one embodiment.
Figure 4B:
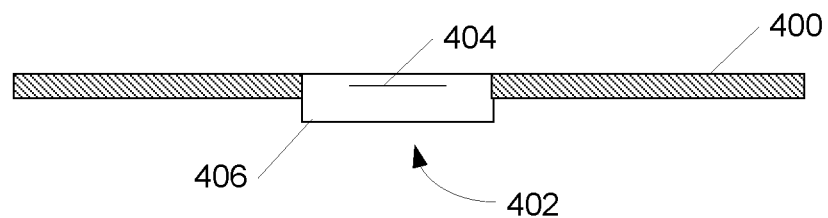

FIG. 4, comprising FIGS. 4A and 4B, is a diagram illustrating an example license plate 400 comprising an RFID tag in accordance with one embodiment. As shown in FIG. 4A, license plate 400 can comprise an open area, or slot 402. For example, slot 402 can be cut into metal license plate 400. Alternatively, slot 402 can be punched out of plate 400. As shown in FIG. 4B, a RFID tag module 406 comprising an enclosure around tag 404 can then be positioned within slot 402. The dimensions of slot 402 and module 406 can be designed such that module 406 fits within slot 402 creating a substantially planar surface with the surface of metal license plate 400. It should be noted that the top of module 406 is shown extending beyond the surface of license plate 400 in FIG. 4B, creating a non-planar surface; however, this is purely for illustration. In practice, module 406 can be made extremely thin allowing for a substantially planar surface across all of plate 400, including slot 402, even when module 406 is installed therein.

Figure 1:
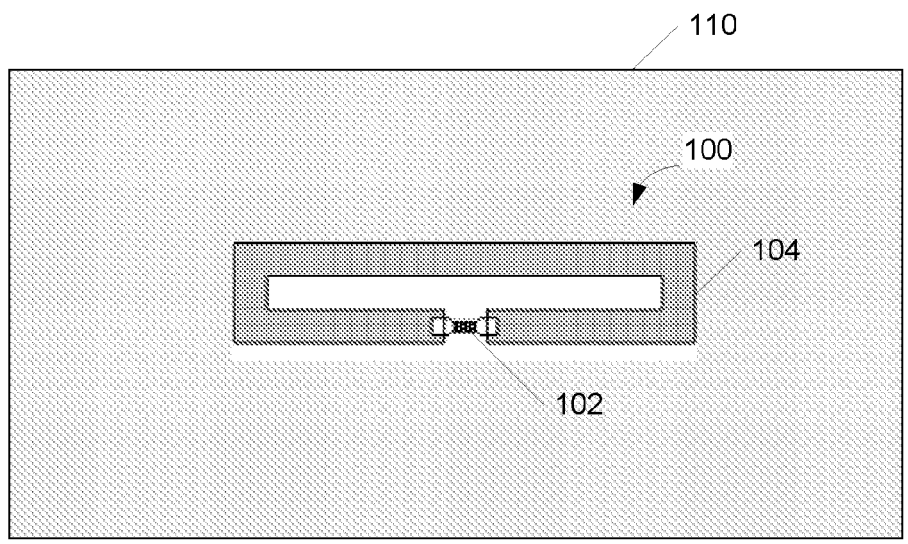
FIG. 1 is a diagram illustrating an exemplary license plate comprising an RFID module.
Figure 2:
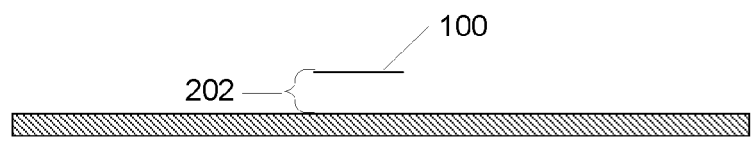
FIG. 2 is a diagram illustrating a side view of the license plate of FIG. 1.
Figure 3:
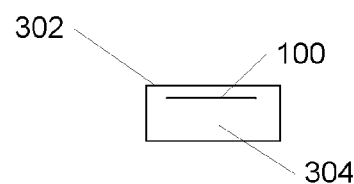
FIG. 3 is a diagram illustrating a RFID module that can be used in conjunction with the license plate of FIGS. 1 and 2.

For example, module 406 can be similar to the module illustrated in FIG. 3. Thus, module 406 can include an enclosure if required. Module 406 can then be configured to include a feeding loop that can couple tag 404 with metal license plate 400. In this manner, the entire license plate 400 can then serve as an effective radiator via inductive coupling through the feeding loop.

Figure 5A:
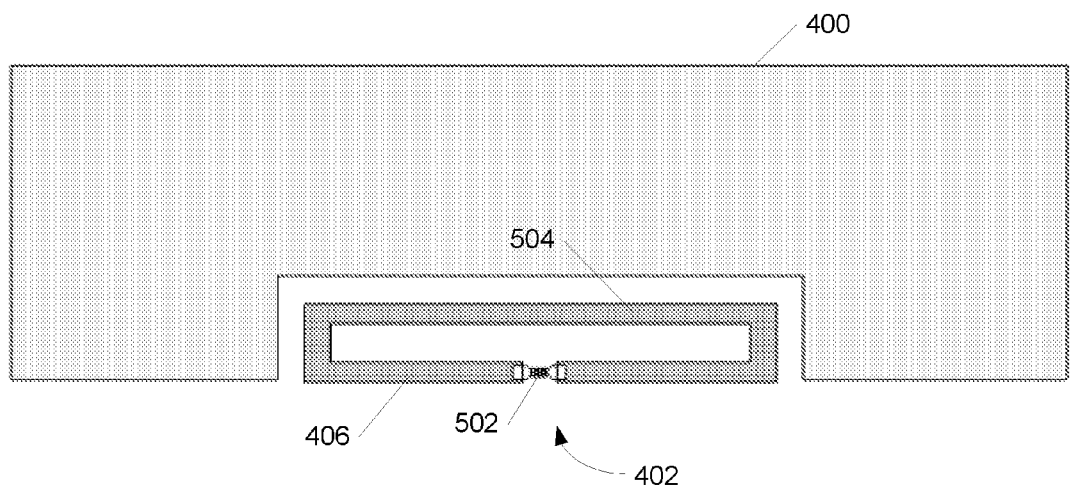
FIGS. 5A and 5B are diagrams illustrating methods for coupling an RFID module with the license plate of FIGS. 4A and 4B.
Figure 5B:
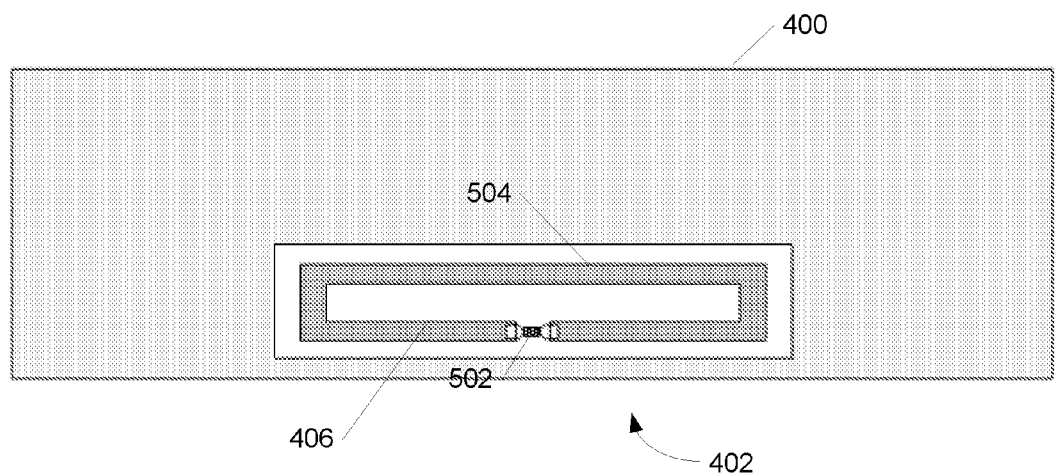

FIGS. 5A and 5B illustrate two example implementations of the embodiment illustrated in FIG. 4. In FIG. 5A, module 406 comprises a chip 502 coupled with a feeding loop 504. Slot 402 is then positioned such that feeding loop 504 will be inductively coupled with metal license plate 400. In FIG. 5B, slot 403 is positioned such that feeding loop 504 is capacitively coupled with metal license plate 400.

Further, in certain embodiments, the radiation gain can be enhanced by using the metallic car frame (not shown). For example, with a properly designed tag antenna and proper consideration of the spacing between the metallic car frame and license plate 400, the metal car frame can be used as a good antenna reflector.

In another embodiment, a structure very similar to Planar Inverted-F Antenna (PIFA) can be implemented by screwing the license plate directly to the metallic car frame as illustrated in FIG. 6. In FIG. 6, which comprises FIGS. 6A-C, metallic screws serve as shorting posts 602 and metallic car frame 600 serves as a ground plane for the antenna of tag module 406.

Figure 7A:
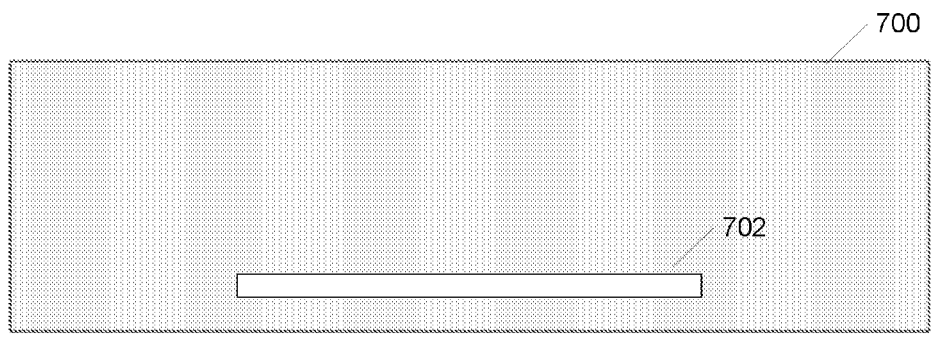
FIGS. 7A-C are diagrams illustrating example RFID enabled license plate in accordance with another embodiment.
Figure 7B:
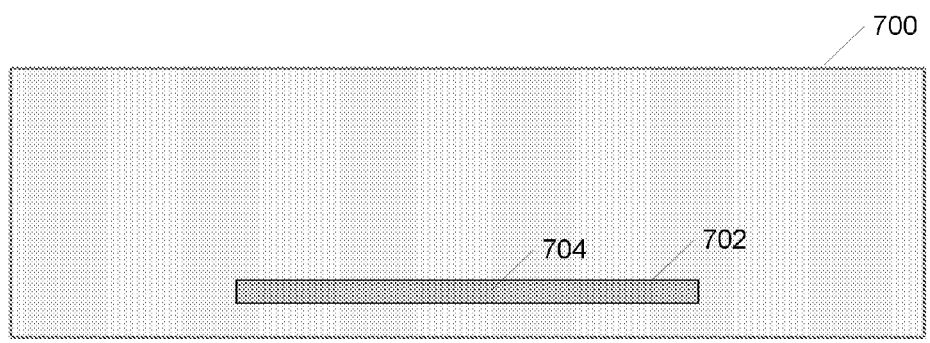
Figure 7C:
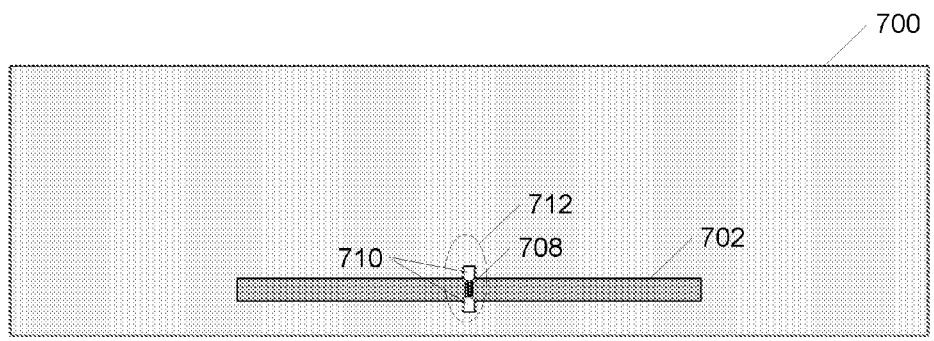

FIG. 7, comprising FIGS. 7A, 7B, and 7C, is a diagram illustrating an example of a license plate 700 configured to incorporate an RFID tag in accordance with another embodiment. As shown in FIG. 7A, an area, or slot 702 is cut, or punched, etc., in license plate 700. As shown in FIG. 7B, a non-metal material 704 can then be inserted into slot 702 such that both the front and rear surfaces of license plate 700 are flat. Material 704 can be stuffed, extruded, etc., into slot 702. As shown in FIG. 7C, an RFID "strap" comprising a chip 708 with contacts 710 can then be positioned over slot 702 as illustrated. Contacts 710 can then be connected to or capacitively coupled with metal license plate 700. Depending on the embodiment, strap 712 can be placed on either the front surface or the rear surface of the license plate. The entire license plate 700 then becomes a slot antenna coupled with the RFID chip, which is less sensitive to the metallic car frame in terms of tag antenna detuning effect. Contacts 710 can be soldered to plate 700, adhered using a conductive paste, or both.

It should also be noted that strap 712 can be made extremely thin, such that the surface of license plate 700 is substantially planar.

In certain embodiments, the dimensions of slot 702 can be altered, or multiple slots included to create a dual or multiple resonance frequency slot antenna. In such configurations, the tag will respond to multiple frequency bands, such as the Ultra High frequency (UHF) band, e.g., 900 MHz, and the microwave band, e.g. 2.45 GHz. This can allow multiple application capability. For example, depending on the application, one frequency band can be preferred for its localization characteristics and another frequency band can be preferred for its long range read capabilities. More specifically, a higher frequency band, such as a 2.45 GHz band, can be used for write applications as its limited range helps insure only the tag of interest is written to, while a lower frequency band, such as a 900 MHz band, can be used for multi-tag read applications as its greater range allows many tags to be read over a large area. In other embodiments, multiple frequency bands can be needed due to regulatory requirements that can vary the authorized frequency band based on locations, e.g., country, city, etc., and by application.

Figure 8:
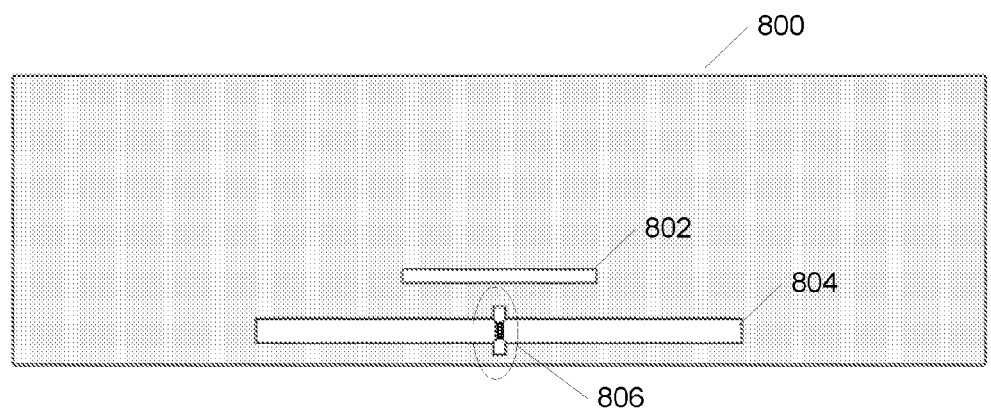
FIG. 8 is a diagram illustrating another example RFID enabled license plate in accordance with another embodiment.
Figure 9:
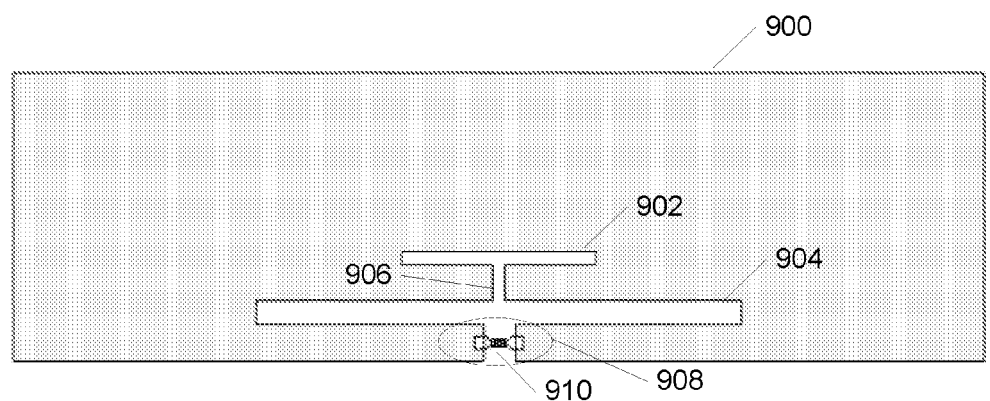
FIG. 9 is a diagram illustrating another example RFID enabled license plate in accordance with another embodiment.

FIGS. 8 and 9 are diagrams illustrating example multi-frequency RFID license plates in accordance with two example embodiments. In FIG. 8, two slots 802 and 804 are formed in metal license plate 800. A strap 806 is then positioned across slot 806 as illustrated. The two slots 802 and 804 are configured, with respect to dimensions, spacing, location, etc., such that the slot antenna formed from license plate 800, slots 802 and 804 and strap 806 will resonate at the desired frequencies, e.g., the UHF and microwave bands.

In FIG. 9, two slots 902 and 904 are formed in license plate 900; however, in this example, slots 902 and 904 are connected via slot 906. A slot 910 then extends to the edge of plate 900. Strap 908 is then positioned across slot 910 as illustrated. Again, slots 902, 904, 906, and 910 are configured such that the resulting slot antenna resonates at the desired frequencies.

The slots of FIGS. 8 and 9 can be filled with non-metallic material as in the example of FIG. 7 depending on the embodiment. Further, certain parasitic elements can be included, or changed to achieve the proper multi-frequency operation. It should also be noted that the embodiments of FIGS. 4 and 5 can also be configured as multi-frequency resonant structures via the inclusion of further slots appropriately constructed so as to allow the structure to resonate at the desired frequencies.

It will be understood that other slot dimensions, locations, spacing, interconnectedness, etc., are possible and will depend on the requirements of a particular implementation. Similarly, the position of the strap comprising the chip and connectors can vary as required by a particular implementation. Accordingly, the specific implementations illustrated herein should not be seen as limiting the embodiments disclosed to any particular configuration.

It will also be understood that the impedance of the resulting antenna structure in the above embodiments will need to be matched to that of the chip. This can impact the slot dimensions, etc. It can also require additional circuit elements, i.e., the inclusion of a matching circuit.

A retro-reflective film can be used to cover the front surface of the license plate. Such a film can make the license plate modification invisible from front view; and can also makes the license plate viewable in dark lighting. If the retro-reflective film contains metal materials, e.g., a metallized polymer film, then a selective metal removal process can be applied such that the film area covering the open area in the license plate is de-metallized. Such a de-metallization is described in detail in co-owned U.S. Pat. No. 7,034,688, as well as Co-owned patent application Ser. No. 10/485,863, each of which are incorporated herein by reference as if set forth in full. In other embodiments, the antenna structure can actually be formed on a retro-reflective layer that is then applied to a non-metallic, or metallic, license plate.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A radio frequency identification (RFID) enabled license plate, comprising:
   a metal license plate having formed thereon a first slot that is perpendicular to a second slot; and
   an RFID strap comprising an RFID chip,
   wherein the first slot and the second slot are configured such that a slot antenna formed from the metal license plate resonates at a first frequency and a second frequency,
   wherein the second slot extends linearly from between both edges of the first slot, and
   wherein the RFID strap is disposed over the second slot in a same plane as and parallel to the first slot.

2. The RFID enabled license plate according to claim 1, wherein the second slot extends linearly from an approximate midpoint of the first slot.

3. The RFID enabled license plate according to claim 1, wherein the second slot extends to an edge of the metal license plate.

4. The RFID enabled license plate according to claim 1, wherein the RFID strap is directly coupled to the metal license plate via one or more electrically conductive contacts.

5. The RFID enabled license plate according to claim 1, wherein the RFID strap is capacitively coupled to the metal license plate.

6. The RFID enabled license plate according to claim 1, further comprising a non-metallic material disposed in at least one of the first slot and the second slot.

7. The RFID enabled license plate according to claim 6, wherein the non-metallic material comprises a dielectric material.

8. The RFID enabled license plate according to claim 1, further comprising a retro-reflective layer over the metal license plate.

9. The RFID enabled license plate according to claim 8, wherein the retro-reflective layer comprises a metallic material, and wherein one or more portions of the retro-reflective layer are selectively removed from an area comprising the first slot and the second slot.

10. The RFID enabled license plate according to claim 1, further comprising a third slot formed on the metal license plate.

11. The RFID enabled license plate according to claim 10, wherein the first slot, the second slot, and the third slot are configured such that a slot antenna formed from the metal license plate further resonates at a third frequency.

12. The RFID enabled license plate according to claim 10, wherein the third slot is parallel to the first slot.

13. The RFID enabled license plate according to claim 10, further comprising a fourth slot formed on the metal license plate.

14. The RFID enabled license plate according to claim 13, wherein the first slot, the second slot, the third slot, and the fourth slot are configured such that a slot antenna formed from the metal license plate further resonates at a fourth frequency.

15. The RFID enabled license plate according to claim 13, wherein the first slot and the third slot are connected via the fourth slot.

* * * * *